Figure 4:
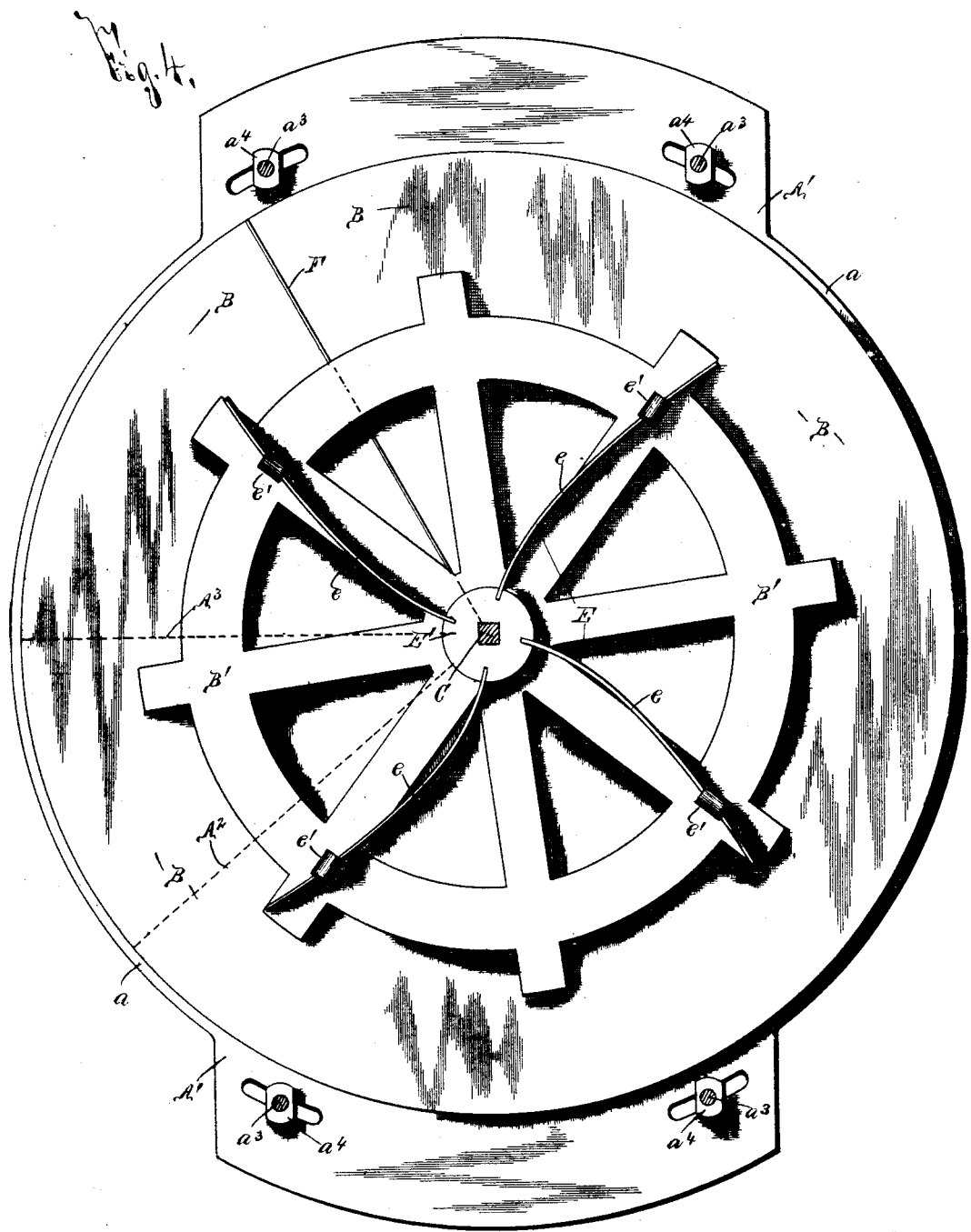

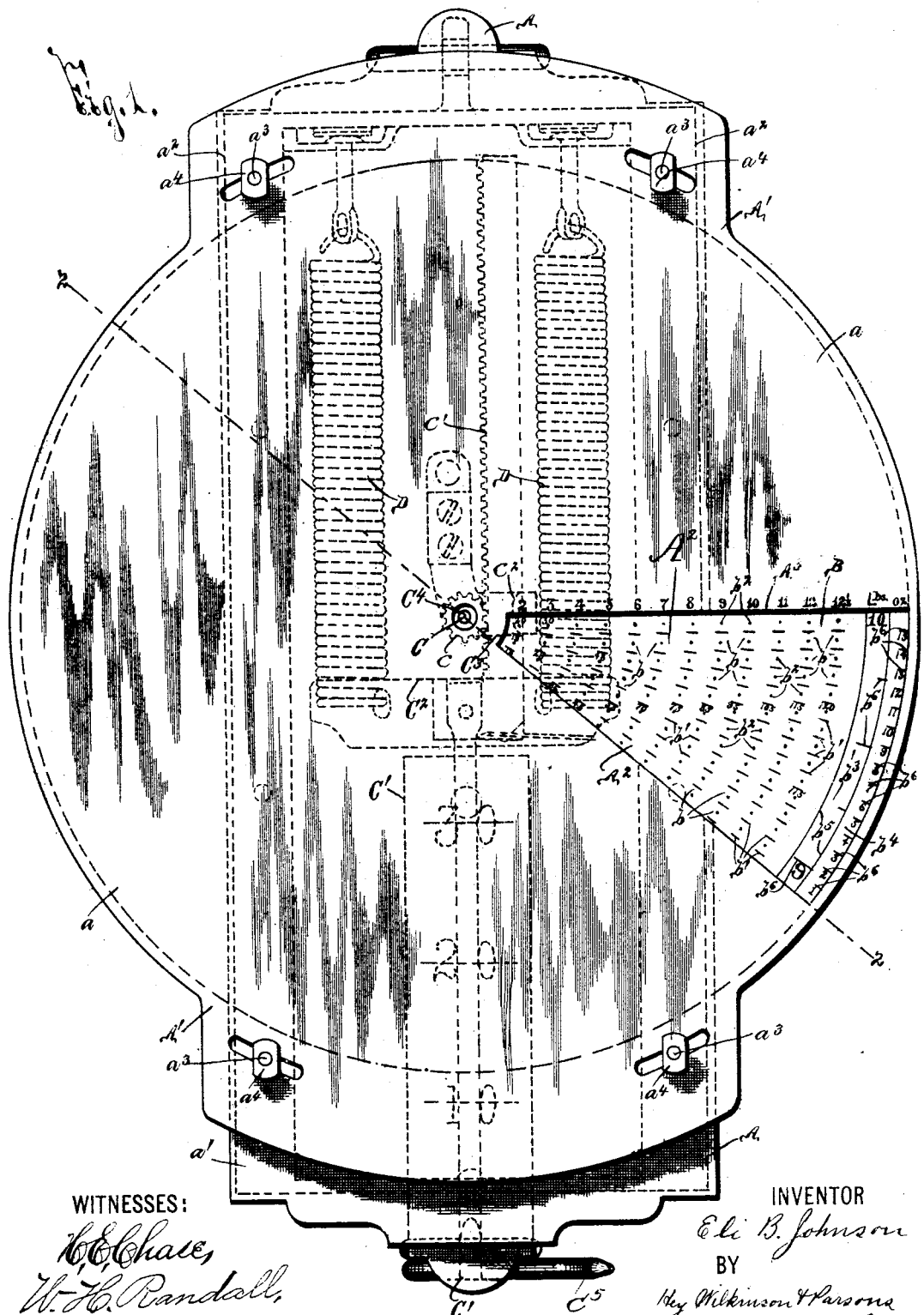

(No Model.) 3 Sheets—Sheet 2.
E. B. JOHNSON.
CALCULATING ATTACHMENT FOR WEIGHING SCALES.
No. 514,471. Patented Feb. 13, 1894.
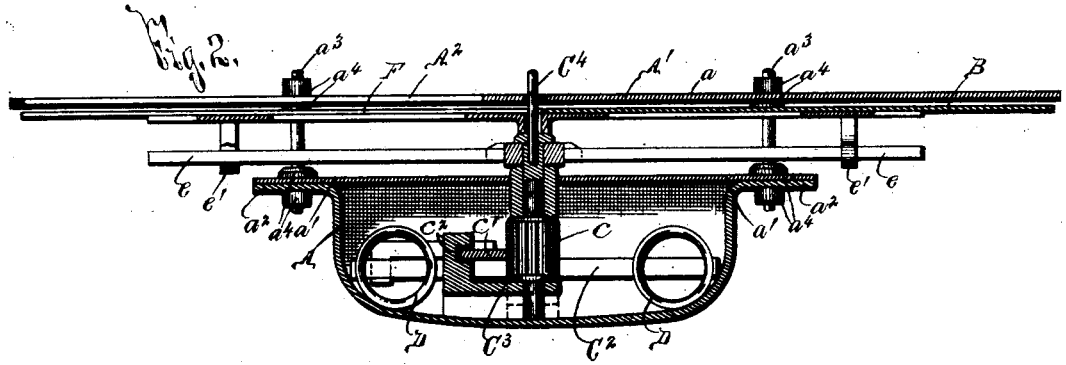
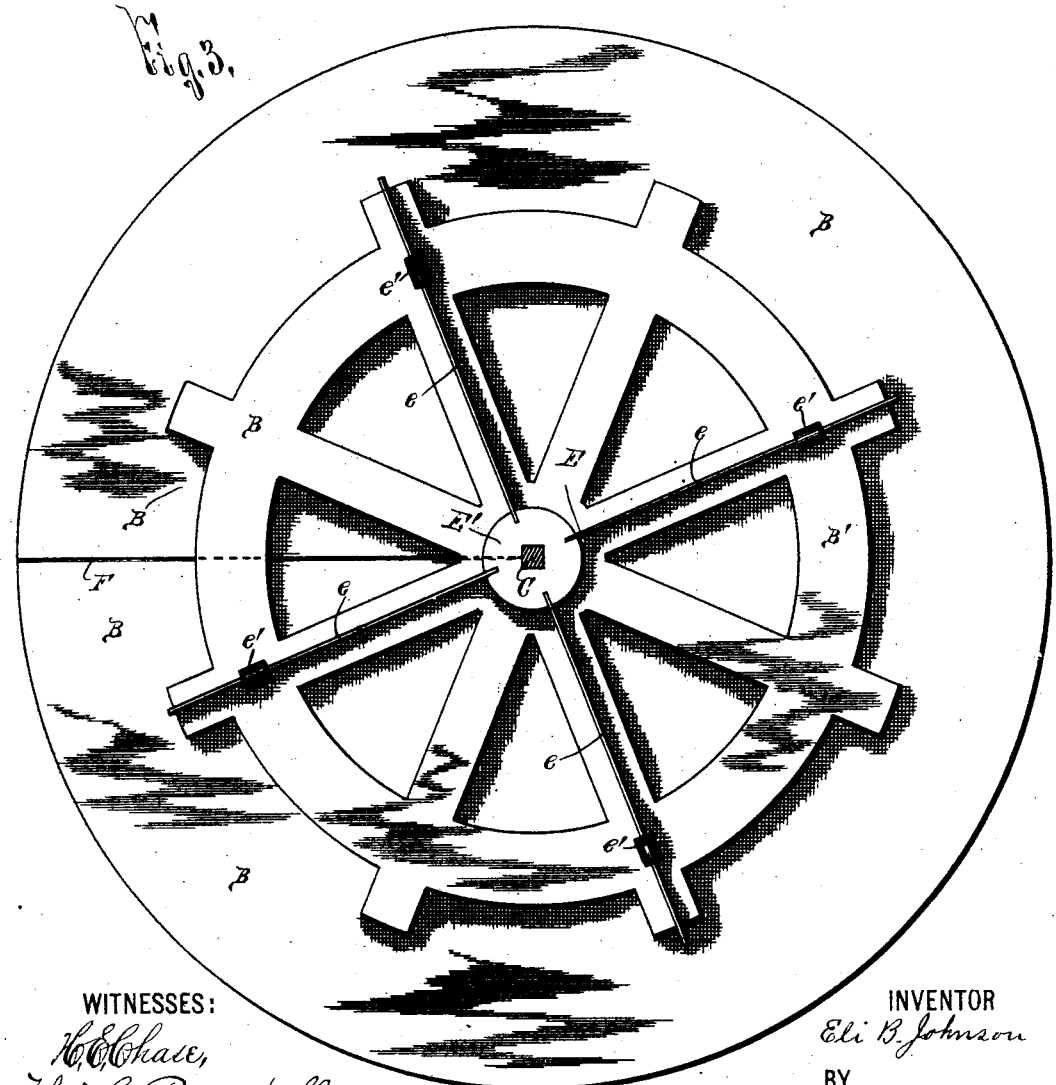
WITNESSES:
H. E. Chase,
W. H. Randall.
INVENTOR
Eli B. Johnson
BY
Key Wilkinson & Parsons
ATTORNEYS.

(No Model.) 3 Sheets—Sheet 3.

E. B. JOHNSON.
CALCULATING ATTACHMENT FOR WEIGHING SCALES.

No. 514,471. Patented Feb. 13, 1894.

WITNESSES:
H. C. Chace,
W. H. Randall

INVENTOR
Eli B. Johnson
BY
Wey. Wilkinson & Parsons
ATTORNEYS.

UNITED STATES PATENT OFFICE.

ELI B. JOHNSON, OF CHAUMONT, NEW YORK.

CALCULATING ATTACHMENT FOR WEIGHING-SCALES.

SPECIFICATION forming part of Letters Patent No. 514,471, dated February 13, 1894.

Application filed August 22, 1891. Serial No. 403,396. (No model.)

*To all whom it may concern:*

Be it known that I, ELI B. JOHNSON, of Chaumont, in the county of Jefferson, in the State of New York, have invented new and useful Improvements in Calculating Attachments for Scales, of which the following, taken in connection with the accompanying drawing, is a full, clear, and exact description.

My invention relates to improvements in calculating attachments for scales, and has for its object the production of a simple, durable, and effective device, which is particularly useful in stores and like places for enabling clerks to quickly, readily, and correctly ascertain the cost of different amounts or weights of commodities at various prices, and is almost instantly restored to its normal position without liability of injury to the parts.

To this end the invention consists, essentially, in the revoluble spindle of a scale, an outer shell or case having an aperture in its front wall and indicating characters along the edge of said aperture, a revoluble disk within said case movably mounted on the spindle and adapted to display a portion of its indicating face through the aperture in said wall, and a retractor consisting of a spring bar having one end rigidly secured to the spindle and the other secured to said indicating disk for yieldingly checking the return movement of the indicating disk and bringing the same to its normal position quickly, positively, and without injury thereto, and in the detail construction and arrangement of the parts, all as hereinafter more particularly described and pointed out in the claims.

In describing this invention, reference is had to the accompanying drawings, forming a part of this specification, in which, like letters indicate corresponding parts in all the views.

Figure 1 is a face view of my improved invention, the parts being shown in operative arrangement. Fig. 2 is a transverse sectional view, taken on line —2—2—, Fig. 1. Fig. 3 is a face view of the inner side of the detached indicating disk representing the same and its retractor in its normal position shown at Fig. 1, and Fig. 4 is a face view of my invention representing the indicating disk as carried beyond its normal position by the momentum produced upon removing the weight from the scale, the outer wall of the case inclosing said indicating plate being also shown.

Upon practical operation of certain calculating attachments designed for scales I have discovered that when the indicating dial or disk is applied directly to the movable spindle of a scale and the weight is suddenly released from the scale the momentum of the indicating disk occasioned by the retraction of the scale and the great diameter of the disk tends to force said disk beyond its normal position, thereby unduly straining or breaking that portion of said disk secured to the spindle, and causing such a vibration of the disk as to prevent it from quickly returning to its normal position.

—A— represents the frame of my improved scale formed with an inclosing case —A'— for the indicator disk —B— having outer and inner walls —a— and —a'—, which are secured to a flange —$a^2$— of the frame —A—, and are held the required distance apart by means of bolts —$a^3$— having shoulders —$a^4$—$a^4$—.

The indicating disk —B— consists preferably of an outer plate formed of paste-board or other light material, and an inner open plate —B'— composed of light metal or other similar strong material suitably secured to the outer plate.

The spindle —C— for rotating the indicating disk, when the scale is operated, is journaled in the frame —A—, and is arranged with one extremity projecting beyond the wall —a'— of the inclosing case —A'—. The central portion of this spindle is provided with a gear —c— with which meshes a movable rack —c'—, Figs. 1 and 2, guided in a way —$c^2$— and formed upon the sliding bar —C'— to the lower end of which is secured by a suitable hook or other connection $C^5$ any suitable construction of weight supporting device not necessary to herein illustrate or describe.

Secured to the upper end of the bar —C'— is a cross bar —$C^2$— having attached thereto one extremity of springs —D— having their other end attached to the wall of the frame —A—.

It will be readily apparent that, as the weight is placed upon the weight supporting device, not illustrated, the movable bar —C'— is drawn downward against the action of the springs —D—, and the spindle —C— rotated in its journal in the frame —A—, and that, as the weight is released, the springs forcibly retract said parts to their normal position.

As previously stated I have found by practical use that when a calculating disk is applied directly to the spindle —C— the springs —D— retract the same so forcibly that the momentum tends to carry the indicating disk beyond its normal position, and the force with which the disk is stopped is extremely liable to break or unduly strain the parts and particularly that portion of said disk secured to said spindle, since the disk must be made extremely light in order to be practical. The cross-bar —$C^2$— upon the draw-bar —C'— is drawn normally against its seat —$C^3$— by springs —D—. As a suitable weight supporting device or pan, not necessary to herein illustrate or describe, which may be of the usual or any desired form, is secured to the bar —C'— by the hook —$C^5$—, the weight of this pan draws the bar —C'— downwardly a slight distance against the action of the springs —D—, and slightly separates the cross bar —$C^2$— from its seat —$C^3$—. The parts of my scale attachment are so designed and relatively arranged that the indicating disk —B— is rocked by this slight movement of the bar —C'— only to its starting point, and does not commence to indicate weight or price until something is placed upon the weight supporting device.

When an article is placed upon said weight supporting device the same is depressed and the bar —C'— is drawn downwardly against the action of the springs —D—, thus further separating the cross-bar —$C^2$— on the bar —C'— from its seat —$C^3$—, and causing the rack —c'— to rotate the spindle —C— for rotating the indicating disk. When said article is removed the springs —D— quickly and forcibly draw the bar —C'— upwardly and rotate the disk —B— backwardly until the cross-bar —$C^2$— abuts against its seat—$C^3$—, after which said bar —C'— is slightly depressed against the action of the springs —D— by the weight of the weight supporting device and the indicating disk is returned to its starting point. It is therefore apparent that the momentum occasioned by the contraction of the spring —D—, when the weight is removed, causes the indicator disk to travel beyond its normal position until the cross-bar —$C^2$— is drawn against the seat —$C^3$—, and that more or less vibration of the indicating disk takes place, which tends to prevent the same from quickly assuming its normal position.

In my present invention I loosely mount the indicating disk and use a retractor —E— between said disk and the spindle —C— for yieldingly stopping the indicator disk and for returning the same almost instantly without injury to its normal position in order that the scale may be quickly reused. The retractor —E— consists preferably of one or more springs —e—, four arranged radially being here illustrated. The outer ends of the springs, here shown as thin flexible bars, are loosely connected to the under face of the indicating disk by means of seats or loops —e'— through which the free ends of the spring bars are passed so as to freely slide therein. The inner ends of these bars are secured to a support —E'— or collar rigidly secured to the spindle C for preventing the further movement of said inner ends after the sliding bar —C'— has assumed its normal position with the weight support mounted thereon. It will be evident, however, that after such retraction of the sliding bar —C'— the disk —B— which is loosely mounted on and flexibly connected to the projecting end —$C^4$— of the spindle —C— by means of the springs —e— is free to revolve by reason of its momentum were it not checked by the spring bars —e—. These bars —e—are, however, tensioned, as shown at Fig. 4, by such free revolution of the disk —B—, and by their resiliency immediately retract the indicating disk and return the same to its normal position. The indicating disk is thus, by its yielding stoppage, effected by the operation of the bars—e—, prevented from breakage or strain, and is also almost instantly returned to its normal position.

The outer wall —a— of the case —A'— inclosing the indicating disk is formed with a triangular aperture —$A^2$— having arranged along its upper edge —$A^3$— certain indicating characters as 2, 3, 4, 5, 6, 7, 8, 9, 10, 11, 12, 12½ lb., and ozs., the numerals indicating prices per pound.

Arranged in concentric lines on the movable indicating disk —B— is a series of index divisions —b— formed by a series of lines —b'— of equal length; or by a series of lines —b'— of equal length, and an alternate series of dots —$b^2$— of less diameter than the length of the lines —b'—.

At the outer edge of the indicator disk and aligned with the abbreviation lb. and oz., is a pair of concentric spaces —$b^3$— and —$b^4$— formed by circular lines —$b^5$— subdivided by cross lines —$b^6$— into a series of divisions, and provided with figures or other characters which are arranged between the cross lines for representing the number indicated by the superimposed line, as pounds on the inner space and ounces on the outer space.

In the spaces —b— and beneath certain of the lines —b'— separated from each other by a common number of spaces —b—, I place a series of figures or marks adapted to enable the clerk or other user to perceive the precise cost of the amount of a commodity indicated at the outer edge of the movable disk, at the price per pound indicated by the figure upon the upper edge —A³— of the face —a—, which is aligned with the concentric row in which said price indicating figure is placed.

To illustrate: Suppose that the weight of the article sold is just ten pounds the indicator disk is automatically revolved until the figure "10" is just beneath the abbreviation lbs. It will then be noted that the figure "20" in the line or circle of cross lines —b'— concentric with the figure "2" along the edge —A³— is just beneath said edge —A³—, thus indicating that the price of ten pounds of a commodity at two cents a pounds is twenty cents. In like manner it is readily perceived that the same amount of a different commodity at three cents is thirty cents; at four cents forty, and so on. The limit of the indicating disk being ten pounds the same is in the same position when indicating ten pounds as when normal, with the exception that the disk has been completely revolved once. I have accordingly, for the purpose of illustrating my invention, shown the correct figure directly beneath the line —A³— when ten pounds are weighed or indicated, but it will be evident that, when the indicating figures are arranged at a common difference, that is, separated by any common number of intervening spaces b for each of the intervening spaces between the cross lines —b'— an additional cent should be added to the amount shown by figures directly beneath said lines, and that for each of the intervening spaces between the lines —b'— and the alternate dots —b²— a half cent should be added to said amount.

To illustrate; suppose the weight of the article sold is just ten pounds the indicator disk is automatically revolved until the figure "10" is just beneath the abbreviation "lbs.," whereupon the figure "48" in one of the concentric rows of figures and cross lines on the indicating disk is beneath the figure "5" at the edge —A³— of the aperture —A²— in the face —a— of the case —A'—. Between the line —b'— directly above the figure "48" and the next upper line —b'— is a full space for which "1" should be added to the "48," making a total of forty-nine cents. Directly above this latter cross line —b'— is a dot —b²—, which is separated from said cross line —b'— by a half space and from the aforesaid edge —A³— by a second half space, for which two half spaces another unit should be added to the amount, making the total cost of ten pounds at five cents per pound fifty cents.

Upon practical operation of an indicating disk I have discovered that said disk, if composed of a single piece of metal or other material, becomes in use sufficiently warped to vary the accuracy of the indication: consequently I either form said disk of separate strips or cut a slit or slot —F— in said disk extending inwardly from its extreme outer edge toward its center, as shown in Figs. 3 and 4, for permitting the adjacent edges of of the slot to move toward and away from each other under the expansion and contraction of the material forming the disk, thus obviating buckling thereof.

It will be evident that the construction of the scale may be greatly varied from that shown and described without departing from the spirit of my invention, provided that the same is formed with a revoluble spindle brought into operation by the placing of the weight upon the scale, and that the arrangement of the indicating figures or characters on the indicating disk may be also varied to suit the designed use of the scale.

The operation of my invention will be readily perceived from the foregoing description and upon reference to the drawings, and it will be particularly noted that the parts are simple in construction and operation, and that the indicating disk is stopped with an easy movement after the removal of the weight from the scale, and that the same is almost instantly retracted to its normal position by the retractor —E—.

It is evident that the detail construction and arrangement of this retractor may be somewhat varied from that shown and described in the claims without departing from the spirit of my invention.

Having thus fully described my invention, what I claim as new, and desire to secure by Letters Patent, is—

1. In a calculating attachment for scales, the combination with a revoluble shaft adapted to be revolved when the scale is operated; of a frame having a set of price indicating characters, a revoluble indicating disk loosely mounted on the shaft and having a series of cost indicating characters thereon adapted to register with the former indicating characters, and a retractor between the revoluble shaft and the revoluble indicating disk for returning said indicating disk to its normal position, substantially as and for the purpose set forth.

2. In a calculating attachment for scales, the combination with a revoluble shaft or spindle adapted to be revolved when the scale is operated; of an indicating disk loosely mounted on the spindle, and a spring having one end rigidly secured to the spindle and the other secured to the disk for returning the disk to its normal position after the retraction of the spindle, substantially as and for the purpose specified.

3. In a calculating attachment for scales, the combination of the revoluble spindle of a scale, an outer face having a series of indicating characters thereon, a revoluble disk loosely revoluble on the spindle and having a series of indicating characters thereon adapted to register with the former indicating characters, and a spring connection between said spindle and the disk for permitting independent movement of the disk and returning the same to its normal position, substantially as specified.

4. In a calculating attachment for scales, the combination of the revolving spindle of the scale, a stationary face having indicating characters thereon, a revoluble indicating disk also provided with indicating characters adapted to register with the former indicating characters, a spring bar having one end loosely connected to said disk and the other secured to said spindle, substantially as and for the purpose specified.

5. In a calculating attachment for scales, the combination with the movable spindle; of a scale, a revoluble indicating disk, a series of seats on said disk, a series of springs movable on said seats, and a support rigidly secured to said springs and to the spindle, substantially as described.

6. In a calculating attachment for scales, the combination of the movable spindle of a scale, a revoluble indicating disk composed of an outer indicating plate and an inner plate, a series of loops on said inner plate, a series of radial springs movable in said loops, and a support rigidly secured to said springs and to the spindle, substantially as and for the purpose described.

In testimony whereof I have hereunto signed my name, in the presence of two attesting witnesses, at Chaumont, in the county of Jefferson, in the State of New York, this 6th day of August, 1891.

ELI B. JOHNSON.

Witnesses:
A. J. DEWEY,
A. L. BYAM.